United States Patent
Dvir et al.

(10) Patent No.: US 8,437,635 B1
(45) Date of Patent: May 7, 2013

(54) METHOD FOR ENABLING AC COUPLING OF HIGH-SPEED BURST DATA SIGNALS TRANSMITTED IN OPTICAL NETWORKS

(75) Inventors: Amiad Dvir, Nes-Ziona (IL); Asaf Koren, Herzliya (IL); David Avishai, Nes-Ziona (IL)

(73) Assignee: Broadcom Corporation, Irvine, CA (US)

( * ) Notice: Subject to any disclaimer, the term of this patent is extended or adjusted under 35 U.S.C. 154(b) by 558 days.

(21) Appl. No.: 12/691,375

(22) Filed: Jan. 21, 2010

(51) Int. Cl.
*H04J 14/00* (2006.01)

(52) U.S. Cl.
USPC .................... 398/67; 398/70; 398/71

(58) Field of Classification Search ............. 398/67–22, 398/153–156, 159–162, 67–72
See application file for complete search history.

(56) References Cited

U.S. PATENT DOCUMENTS

| | | | |
|---|---|---|---|
| 6,963,696 B1 * | 11/2005 | Bowler et al. | 398/202 |
| 7,023,868 B2 * | 4/2006 | Rabenko et al. | 370/419 |
| 7,599,631 B2 | 10/2009 | Heqing | |
| 2003/0048852 A1 * | 3/2003 | Hwang et al. | 375/240.26 |
| 2004/0032918 A1 * | 2/2004 | Shor et al. | 375/345 |
| 2005/0238014 A1 | 10/2005 | Kang | |
| 2007/0086792 A1 * | 4/2007 | Regev | 398/209 |
| 2009/0103932 A1 | 4/2009 | Yi | |

* cited by examiner

*Primary Examiner* — Dzung Tran
(74) *Attorney, Agent, or Firm* — Sterne, Kessler, Goldstein & Fox P.L.L.C.

(57) ABSTRACT

A method for enabling alternating current (AC) coupling of high-speed burst data signals transmitted by an optical network unit (ONU). The method comprises generating a first data pattern to be sent to an optical transceiver through an AC coupling circuit, wherein the first data pattern is a direct current (DC) balanced pattern; generating a second data pattern to be sent to the optical transceiver through the AC coupling circuit, wherein the second data pattern is output prior to transmission of a high-speed burst data signal; and generating a third data pattern to be sent to the optical transceiver through the AC coupling circuit, wherein the third data pattern is output posterior to the transmission of the high-speed burst data signal.

22 Claims, 5 Drawing Sheets

METHOD FOR ENABLING AC COUPLING OF HIGH-SPEED BURST DATA SIGNALS TRANSMITTED IN OPTICAL NETWORKS

TECHNICAL FIELD

The present invention relates generally to transmission of high-speed burst data signals in optical networks.

BACKGROUND OF THE INVENTION

Many communication networks that provide high bit-rate transport over a shared medium are characterized by non-continuous or burst data transmission. A typical PON includes a plurality of optical network units (ONUs) connected to an optical line terminal (OLT) via a passive optical splitter. Traffic data transmission is performed over two optical wavelengths, one for the downstream direction and another for the upstream direction. Thus, the OLT continuously transmits downstream data to the ONUs and receives upstream burst data sent to the OLT from ONUs.

An ONU transmits data to the OLT during different time slots allocated by the OLT. Transmission from an ONU to the OLT is in the form of a burst. An ONU includes an optical transceiver that receives continuous data and transmits burst data. Every burst data transmission is preceded by a Start-of-Burst (SoB) signal and followed by an End-of-Burst (EoB) signal that respectively enables and disables the optical transmitter. The OLT must identify these signals to properly recover the transmitted data. Thus, no other signals should be output when the ONU transceiver does not transmit.

To allow this, PON communication standards such as the Gigabit PON (GPON) requires that a low-logic value ('0') signal will be transmitted when there is no data to output. For example, as shown in FIG. 1, from T0 to T2 a low-logic value signal is transmitted and at T1 the SoB/EoB signal is asserted. As illustrated in FIG. 1, the SoB/EoB signal is asserted prior to the transmission of the data to enable the laser of the optical transmitter to reach its working point. During the time interval from T2 to T3, a burst data signal is transmitted, and thereafter a low-logic value signal is transmitted. At T4, the SoB/EoB signal is de-asserted to disable the optical transmitter.

FIG. 2 shows a schematic diagram of an ONU 200 that includes a medium access control (MAC) module 210 that generates the burst data and low-logic value signals. The MAC module 210 is a logic component implemented as an integrated circuit (IC). The ONU also includes an optical transceiver 220 which its transmitter part generates and transmits optical signals respective of the input data signals provided by the MAC module 210.

The MAC module 210 and optical transceiver 220 operate at different direct current (DC) levels V1 and V2 respectively. Typically, the DC level of the MAC module 210 (V1) is significantly lower than the DC level of the optical transceiver 220 (V2), in particular, when the size of the IC including the MAC module 210 is designed to support advanced semiconductor fabrication techniques.

Typically, burst data signals generated by the MAC module 210 are offset by a certain biased DC level. To remove the biased DC level of a burst data signal, which is an alternating current (AC) signal, an AC coupling circuit 230 is utilized to interface between the MAC module 210 and the optical transceiver 220. The AC coupling circuit 230 is comprised of serial capacitors and resistors connected in the data path between the MAC module 210 and the optical transceiver 220. The AC coupling is required to filter and block DC and low frequency signals. However, during AC coupling, use of coupling capacitors may cause base line wander problems to occur when a long string of information is repeatedly included in a sequence of identical bits. For example, in high-speed communication standards, such as GPON, the number of identical bits is typically large, thus transmitting the pattern depicted in FIG. 1 would results in losing information, in practical operation, when the laser of the optical transceiver is turned on or shut down.

Some techniques discussed in the related art suggest decoding the transmitted data using DC balanced codes, such as a Manchester code, an ANSI Fiber-Channel 8B10B code, and the like. However, advanced high-speed communication standards, such as the GPON and 10XPON do not allow decoding the transmitted data, but rather require that the transmitted burst data signals will be scrambled using a polynomial method. In addition, such techniques result in loss of data during the beginning of the burst.

Therefore, it would be advantageous to provide a solution that limits the disadvantages of existing AC coupling techniques.

SUMMARY OF THE INVENTION

Certain embodiments of the invention include a method for enabling alternating current (AC) coupling of high-speed burst data signals transmitted by an optical network unit (ONU). The method comprises generating a first data pattern to be sent to an optical transceiver through an AC coupling circuit, wherein the first data pattern is a direct current (DC) balanced pattern; generating a second data pattern to be sent to the optical transceiver through the AC coupling circuit, wherein the second data pattern is output prior to transmission of a high-speed burst data signal; and generating a third data pattern to be sent to the optical transceiver through the AC coupling circuit, wherein the third data pattern is output posterior to the transmission of the high-speed burst data signal.

Certain embodiments of the invention also include an optical network unit (ONU). The ONU comprises a medium access control (MAC) module; an alternating current (AC) coupling circuit coupled to the MAC module; an optical transceiver coupled to the AC coupling circuit, wherein the MAC module is adapted to enable AC coupling when transmitting high-speed burst data signals by: generating a first data pattern to be sent to the optical transceiver through the AC coupling circuit, wherein the first data pattern is a direct current (DC) balanced pattern; and generating a second data pattern to be sent to the optical transceiver through the AC coupling circuit, wherein the second data pattern is output prior to transmission of a high-speed burst data signal; generating a third data pattern to be sent to the optical transceiver through the AC coupling circuit, wherein the third data pattern is output posterior to the transmission of the high-speed burst data signal.

Certain embodiments of the invention further include an apparatus for generating a transmission data pattern enabling AC coupling of high-speed burst data signals transmitted by an optical network unit (ONU) of a passive optical network (PON). The transmission data pattern comprises a first data pattern, wherein the first data pattern is a direct current (DC) balanced pattern; a second data pattern that follows the first data pattern and precedes a high-speed burst data signal; a high-speed burst data signal; and a third data pattern that follows the high-speed burst data signal.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
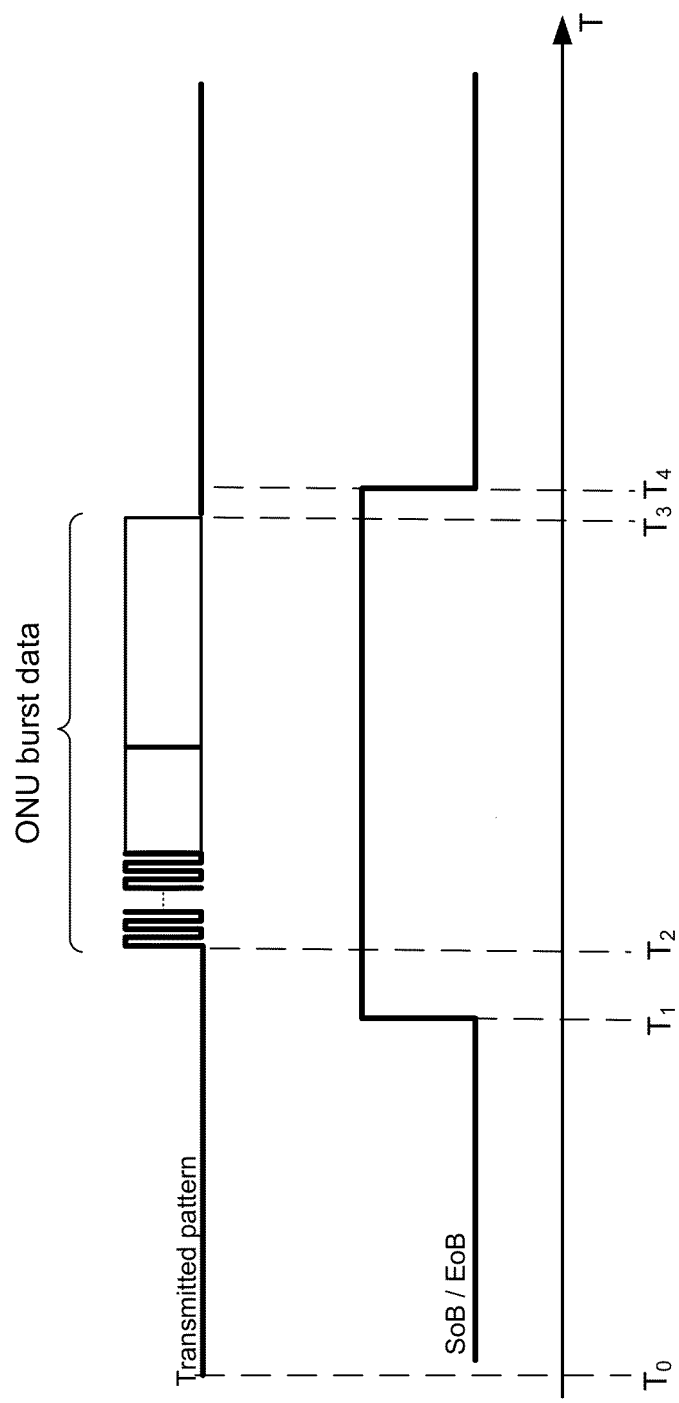
FIG. 1 illustrates a transmission pattern of an ONU.
Figure 2:
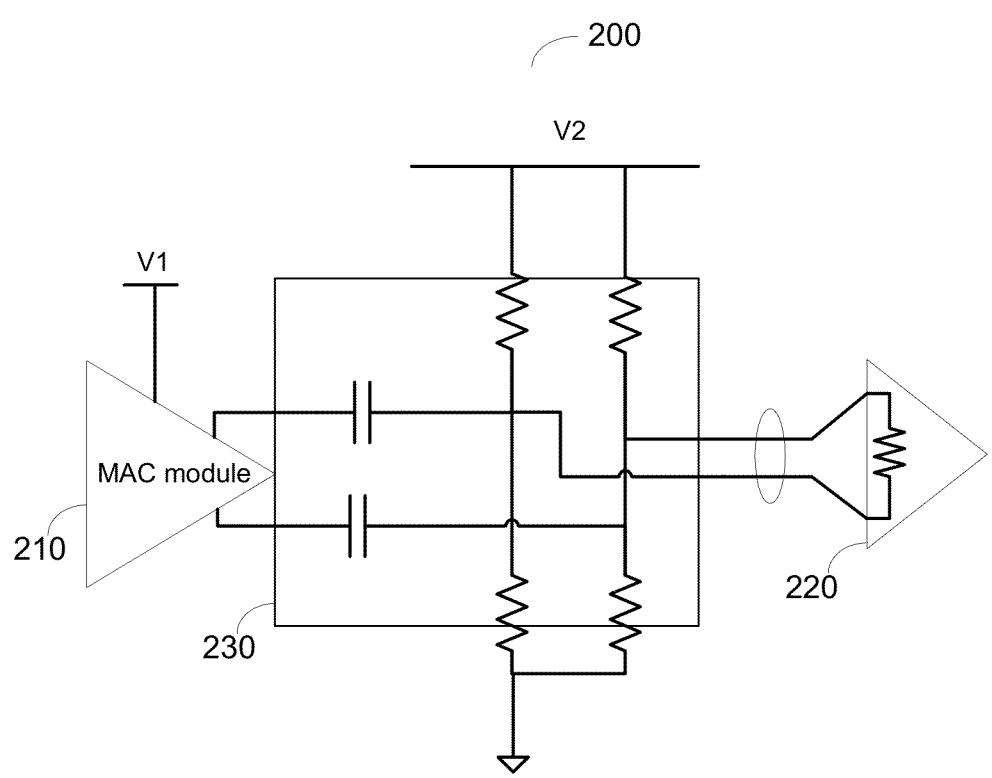
FIG. 2 is a schematic diagram of an ONU including an AC coupling circuit.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain embodiments of the invention include a method to transmit DC balanced signal when no data should be transmitted into the optical line of the network. The disclosed AC coupling technique allows unbiasing the DC level of the transmitted data signal, while maintaining the AC swing of the signal. As a result transmission of high-speed burst data signals is enabled without losing data. In accordance with an embodiment of the invention the high-speed burst data signals are signals sent from ONUs to an OLT in a Gigabit PON (GPON) or higher rate PONS.

Figure 3:
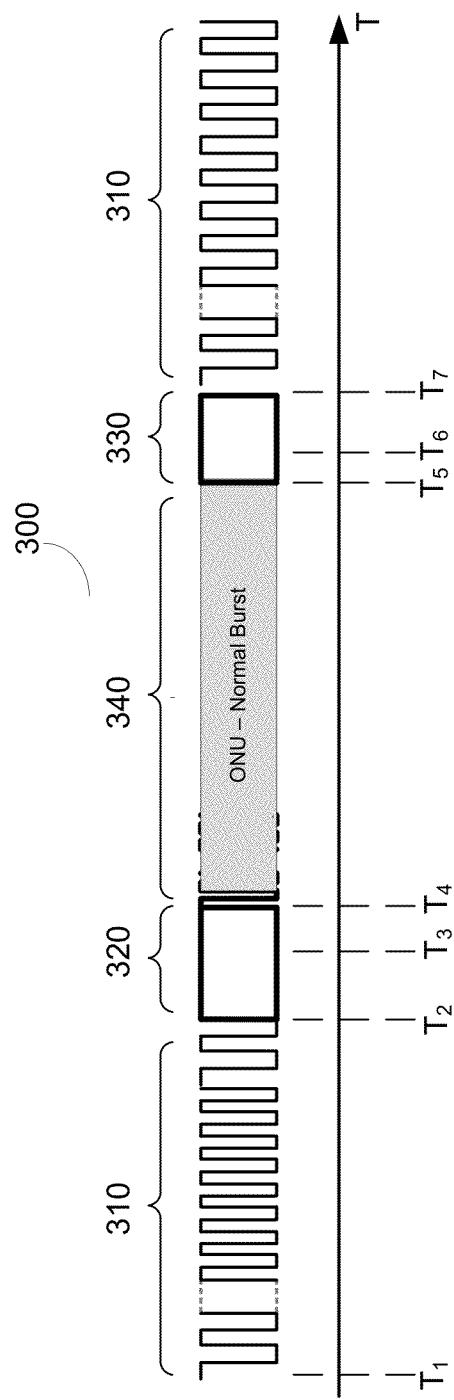
FIG. 3 illustrates a transmission pattern of an ONU generated in accordance with an embodiment of the invention.

FIG. 3 shows a non-limiting diagram illustrating a transmission pattern 300 generated in accordance with an embodiment of the invention. The transmission pattern 300 includes a first pattern (hereinafter the "fill-in pattern") 310, second and third data pattern 320 and 330 and an original burst of data 340 to be transmitted to the OLT. The transmission pattern 300 is generated by the MAC module (e.g., module 210). The fill-in pattern 310 is a DC balanced pattern, e.g., a sequence of alternating '0' bit and '1' bit, a 50% duty cycle clock, and the like.

The second and third patterns 320 and 330 are also DC balanced patterns that are predefined according to the requirements of the network. As a non-limiting example, if the network is a GPON, a predefined number of low-logic value ('0') bits should be transmitted before and after the original burst data signal 340, as required by the GPON specification, for example, GPON spec G.984.2.

Figure 4:
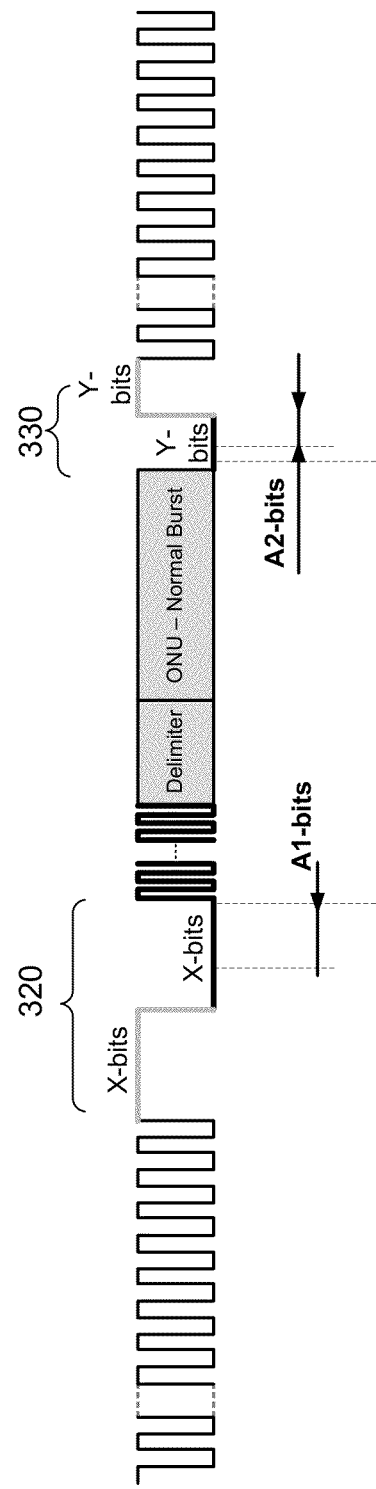
FIG. 4 illustrates a transmission pattern of an ONU to be transmitted in a GPON system generated in accordance with an embodiment of the invention.

FIG. 4 shows the second and third patterns 320 and 330 defined to comply with at least the GPON or the 10XPON standards. The second pattern 320 includes a number of X high-logic value ('1') bits followed by a number of X low-logic value ('0') bits (X is an integer number greater than 1). The third pattern 330 includes a number of Y low-logic value ('0') bits followed by a number of Y high-logic value ('1') bits (Y is an integer number greater than 1). In order to ensure that the original burst of data 340 will not be corrupted, a number of A1 bits out of the X bits and a number of A2 bits out of the Y bits must include low-logic value ('0') bits. For example, in the GPON spec G.984.2, the turn on time is limited to 16 bits, thus the value of X is 16 bits. Typically, the laser of the transceiver is ready after 12 bits, thus the SoB/EoB signal is asserted after 12 bits and A1 equals to 4 bits.

Referring back to FIG. 3, the first pattern 310 is generated and output between T1 and T2, when the optical transmitter (e.g., transmitter 220) is disabled. Between T2 and T4, the second pattern 320 is generated and output. At T3, during the second pattern, the SoB/EoB signal (not shown) is asserted to enable the optical transmitter. At the end of the second pattern 320, the original burst data signal 340 is transmitted to the optical line for the duration from T4 to T5.

Between T5 and T7, the third pattern 330 is generated and output. At T6 during the transmission of the third patent pattern 330, the SoB/EoB signal (not shown) is de-asserted to disable the optical transmitter. At T7 and thereafter the first pattern 310 is output by the MAC module.

It should be noted that the burst data signals transmitted by ONUs are scrambled signals, thus having DC balance properties. The patterns 310, 320 and 330 are DC balanced, thus the transmission pattern 300 has a good DC balance. Therefore, it is possible to pass the transmission pattern 300 through an AC coupling circuit without altering burst data signals or losing information contained in these signals. In addition, capacitors of the AC coupling circuit are chosen to have capacitance values that will ensure proper signal integrity regardless of the physical characteristics of the PON.

Figure 5:
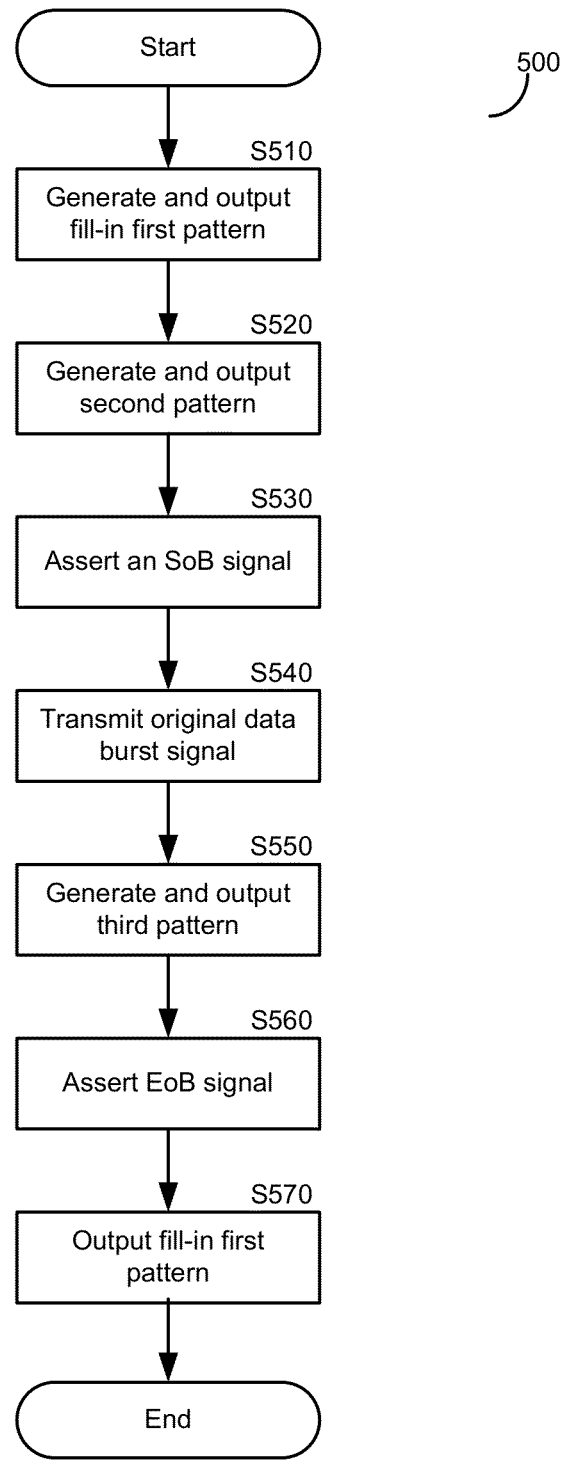
FIG. 5 is a flowchart describing a method for enabling efficient AC coupling of high-speed burst signals transmitted by an ONU.

FIG. 5 shows an exemplary and non-limiting flowchart 500 describing the method for enabling AC coupling of high-speed burst data signals as implemented according to an embodiment of the invention.

At S510 the fill-in (first) pattern is generated and input to the optical transmitter. The first pattern is a DC balanced pattern produced by a MAC module. The MAC module is coupled to an optical transmitter using an AC coupling circuit. At S520 a second predefined DC balanced pattern is generated and output. The second pattern includes at least a predefined number (A1) of low-logic value ('0') bits. The second pattern is generated and transmitted prior to the original burst of data signal. At S530 after outputting the predefined number (A1) of low-logic value ('0') bits (A1 is an integer number greater than 1), a signal enabling the optical transmitter is asserted.

At S540, upon outputting the entire second pattern, the burst data signal is transmitted. This signal is an original data signal that was not modified or encoded using any DC balanced codes. In certain embodiments, the burst data signal is scrambled using a polynomial function. At S550, upon completing the transmission of the burst data signal, a third predefined DC balanced pattern is generated and transmitted. In accordance with one embodiment of the invention the third pattern includes a predefined number (A2) of low-logic value ('0') bits. At S560, after outputting a predefined number (A2) of '0' bits (A2 is an integer number greater than 1), a signal disabling the optical transmitter is asserted. At S570, upon outputting the entire third pattern, the first pattern is generated and output. It should be noted that all data patterns are generated by the MAC module and are transmitted by the transceiver if the SoB/EoB signal is enabled.

The principles of the invention may be implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

The invention claimed is:

1. A method for enabling alternating current (AC) coupling of high-speed burst data signals transmitted by an optical network unit (ONU), comprising:
   outputting a first data pattern to an optical transceiver through an AC coupling circuit, wherein the first data pattern is a direct current (DC) balanced pattern;
   outputting a second data pattern to the optical transceiver through the AC coupling circuit prior to transmission of a high-speed burst data signal;
   enabling, during the outputting of the second data pattern, transmission from the optical transceiver;
   outputting a third data pattern to the optical transceiver through the AC coupling circuit after the transmission of the high-speed burst data signal; and
   disabling, during the outputting of the third data pattern, transmission from the optical transceiver.

2. The method of claim 1, further comprising:
   providing the optical transceiver with the high-speed burst data signal to be transmitted between the second data pattern and the third data pattern.

3. The method of claim 2, further comprising:
   repeating the outputting of the first data pattern after the outputting of the third data pattern.

4. The method of claim 1, wherein
   enabling transmission from the optical transceiver includes outputting a first predefined number of bits prior to the transmission of the high-speed burst data signal; and
   disabling transmission from the optical transceiver includes outputting a second predefined number of bits after the transmission of the high-speed burst data signal.

5. The method of claim 4, wherein the second data pattern includes a sequence of a third predefined number of high-logic value bits and a fourth predefined number of low-logic value bits, wherein the third predefined number and the fourth predefined number are greater than 1 and greater than the first predefined number of bits, and wherein a last portion of the second data pattern is low-logic value bits.

6. The method of claim 4, wherein the third data pattern includes a sequence of a third predefined number of low-logic value bits and a sequence of a fourth predefined number of high-logic value bits, wherein the third predefined number and the fourth predefined number are greater than 1 and greater than the second predefined number of bits, and wherein a first portion of the third data pattern is low-logic value bits.

7. The method of claim 4, wherein outputting the second data pattern includes outputting a sequence of a third predefined number of high-logic value bits and a fourth predefined number of low-logic value bits, the third predefined number and the fourth predefined number being greater than 1.

8. The method of claim 7, wherein the third predefined number and the fourth predefined number are greater than the first predefined number of bits.

9. The method of claim 4, wherein outputting the second data pattern includes outputting low-logic value bits as a last portion of the second data pattern.

10. The method of claim 1, wherein the first data pattern, the second data pattern and the third data pattern are generated by a medium access control (MAC) module of the ONU.

11. The method of claim 10, wherein the ONU further includes the optical transceiver and the AC coupling circuit.

12. The method of claim 11, wherein the ONU is operable in a passive optical network (PON), wherein the PON is any of a gigabit PON (GPON) and a 10XPON.

13. An optical network unit (ONU) comprising:
   a medium access control (MAC) module;
   an alternating current (AC) coupling circuit coupled to the MAC module; and
   an optical transceiver coupled to the AC coupling circuit, wherein
   the MAC module is configured to:
      output a first data pattern to the optical transceiver through the AC coupling circuit, wherein the first data pattern is a direct current (DC) balanced pattern;
      output a second data pattern to the optical transceiver through the AC coupling circuit prior to transmission of a high-speed burst data signal;
      enable, during the outputting of the second data pattern, transmission from the optical transceiver;
      output a third data pattern to the optical transceiver through the AC coupling circuit after the transmission of the high-speed burst data signal; and
      disable, during the outputting of the third data pattern, transmission from the optical transceiver.

14. The ONU of claim 13, wherein the MAC module is further configured to provide the optical transceiver with the high-speed burst data signal to be transmitted between the second data pattern and the third data pattern.

15. The ONU of claim 14, wherein the MAC module is configured to again output the first data pattern after outputting the third data pattern.

16. The ONU of claim 13, wherein,
   to enable transmission from the optical transceiver, the MAC module is configured to output a first predefined number of bits prior to the transmission of the high-speed burst data signal; and
   to disable transmission from the optical transceiver, the MAC module is configured to output a second predefined number of bits after the transmission of the high-speed burst data signal.

17. The ONU of claim 16, wherein the second data pattern includes a sequence of a third predefined number of high-logic value bits and a fourth predefined number of low-logic value bits, wherein the third predefined number and the fourth predefined number are greater than 1 and greater than the first predefined number of bits, and wherein a last portion of the second data pattern is low-logic value bits.

18. The ONU of claim 16, wherein the third data pattern includes a sequence of a third predefined number of low-logic value bits and a sequence of a fourth predefined number of high-logic value bits, wherein the third predefined number and the fourth predefined number are greater than 1 and greater than the second predefined number of bits, and wherein a first portion of the third data pattern is low-logic value bits.

19. The ONU of claim 18, wherein the MAC module is configured to operate at a first voltage level and the optical transceiver is configured to operate at a second voltage level, wherein the first voltage level is lower than the second voltage level.

20. The ONU of claim 13, wherein the ONU is operable in a passive optical network (PON), wherein the PON is any of a gigabit PON (GPON) and a 10XPON.

21. An apparatus for generating a transmission data pattern enabling AC coupling of high-speed burst data signals transmitted by an optical network unit (ONU) of a passive optical network (PON), the apparatus comprising:
  an optical transceiver; and
  a medium access control (MAC) module configured to output, to the optical transceiver:
    a first data pattern that is a direct current (DC) balanced pattern;
    a second data pattern that follows the first data pattern and precedes a high-speed burst data signal, wherein the second data pattern includes a sequence of a first predefined number of high-logic value bits and a sequence of a second predefined number of low-logic value bits, wherein the first predefined number and second predefined number are greater than 1;
    the high-speed burst data signal; and
    a third data pattern that follows the high-speed burst data signal.

22. An apparatus for generating a transmission data pattern enabling AC coupling of high-speed burst data signals transmitted by an optical network unit (ONU) of a passive optical network (PON), the apparatus comprising:
  an optical transceiver; and
  a medium access control (MAC) module configured to output, to the optical transceiver:
    a first data pattern that is a direct current (DC) balanced pattern;
    a second data pattern that follows the first data pattern and precedes a high-speed burst data signal;
    the high-speed burst data signal; and
    a third data pattern that follows the high-speed burst data signal, wherein the third data pattern includes a sequence of a first predefined number of low-logic value bits and a sequence of a second predefined number of high-logic value bits, wherein the first predefined number and the second predefined number are greater than 1.

* * * * *